United States Patent
Naito

(10) Patent No.: US 10,026,932 B2
(45) Date of Patent: Jul. 17, 2018

(54) BATTERY MODULE

(71) Applicant: TOYOTA JIDOSHA KABUSHIKI KAISHA, Toyota-shi, Aichi-ken (JP)

(72) Inventor: Takayuki Naito, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 140 days.

(21) Appl. No.: 15/066,101

(22) Filed: Mar. 10, 2016

(65) Prior Publication Data

US 2016/0268556 A1 Sep. 15, 2016

(30) Foreign Application Priority Data

Mar. 10, 2015 (JP) ................................. 2015-047338

(51) Int. Cl.
| | |
|---|---|
| H01M 2/00 | (2006.01) |
| H01M 2/02 | (2006.01) |
| H01M 2/10 | (2006.01) |
| H01M 2/20 | (2006.01) |
| H01M 10/04 | (2006.01) |
| H01M 10/42 | (2006.01) |
| H01M 10/48 | (2006.01) |

(52) U.S. Cl.
CPC ....... *H01M 2/0237* (2013.01); *H01M 2/1077* (2013.01); *H01M 2/206* (2013.01); *H01M 10/0468* (2013.01); *H01M 10/425* (2013.01); *H01M 10/482* (2013.01); *H01M 10/486* (2013.01); *H01M 2220/20* (2013.01)

(58) Field of Classification Search
CPC .. H01M 10/486; H01M 2/1077; H01M 2/206; H01M 10/01468; H01M 10/425; H01M 10/482; H01M 2/0237; H01M 2220/20
See application file for complete search history.

(56) References Cited

U.S. PATENT DOCUMENTS

2012/0286739 A1* 11/2012 O'Brien, Jr. ........ H01M 2/1077
320/134
2014/0087221 A1* 3/2014 Kim .................... H01M 10/482
429/90

FOREIGN PATENT DOCUMENTS

| JP | 2009-117149 A | 5/2009 |
|---|---|---|
| JP | 2010-40295 A | 2/2010 |
| JP | 2013-51085 A | 3/2013 |
| JP | 5630431 B2 | 11/2014 |

* cited by examiner

*Primary Examiner* — Mark F. Huff
*Assistant Examiner* — Monique M Wills
(74) *Attorney, Agent, or Firm* — Sughrue Mion, PLLC

(57) ABSTRACT

A battery module includes: a stacked body that includes a plurality of battery cells; a restraint including a metal band that extends from one end of the stacked body to the other end of the stacked body and that is electrically grounded; a voltage sensor configured to detect a voltage of the portion of battery cells; a first wire that is connected to the voltage sensor and extends in a stacking direction; a temperature sensor configured to measure a temperature of the stacked body or a current sensor configured to measure a current that flows into and out of the stacked body; and a second wire that is connected to the temperature or current sensor, and extends in the stacking direction. A voltage lower than that of the first wire is applied to the second wire, and the metal band is arranged between the first wire and the second wire.

9 Claims, 9 Drawing Sheets

BATTERY MODULE

INCORPORATION BY REFERENCE

The disclosure of Japanese Patent Application No. 2015-047338, filed on Mar. 10, 2015, including the specification, drawings and abstract, is incorporated herein by reference in its entirety.

BACKGROUND

1. Field

The present disclosure relates to a battery module. More particularly, the present disclosure relates to a battery module provided with a voltage sensor.

2. Description of Related Art

Japanese Patent Application Publication No. 2010-40295 (JP 2010-40295 A) describes a battery module that includes a stacked body formed by an array of a plurality of battery cells, end plates provided one on each end of this stacked body, and restraining bands that restrain the end plates.

In such a battery module, negative terminals and positive terminals provided on the battery cells are connected together by a bus bar, such that the battery cells are connected together in series. Also, a power line is connected to the battery module, and this power line is connected to a power control unit via a SMR (System Main Relay) or the like.

Further, the battery module is provided with voltage sensors that measure the voltage of each battery cell, a voltage detection line that is connected to each voltage sensor as well as to a battery ECU (Electronic Control Unit), a temperature sensor that measures the temperature at a predetermined location of the stacked body, and a thermistor line that is connected to the temperature sensors as well as to the battery ECU. The voltage sensors are typically connected to the negative terminals and the positive terminals of the battery cells.

Here, the power control unit includes a converter and an inverter. The power control unit is electrically connected to a motor. Also, noise generated by the motor, the converter, and the inverter while a vehicle is being driven reaches the battery module via the power line. The noise that reaches the battery module also enters the voltage sensors and the voltage detection line through the terminals of the battery cells.

Further, if the voltage detection line and the thermistor line are provided in positions close to one another, noise transmitted to the voltage detection line will be transmitted to the thermistor line, and as a result, noise will also enter the output of the thermistor line.

In order to inhibit noise from entering the thermistor line in this way, it is conceivable to connect a filter between the power control unit and the battery module, or increase the distance between the voltage detection line and the thermistor line, for example.

However, providing a filter may increase the costs. Also, if the thermistor line is simply distanced from the voltage detection line so that the noise that is superimposed on the thermistor line becomes sufficiently small, the thermistor line may end up being in a position that is also distanced from the battery module, which may create problems for mounting of the battery module.

In the battery module, a current detection line from a current sensor is also provided in addition to the thermistor line, and voltage lower than that of the voltage detection line is applied to this current detection line. If the current detection line is provided close to the voltage detection line, noise from the voltage detection line may also be transmitted to the current detection line.

SUMMARY

The present disclosure relates to a battery module in which the transmission of noise from a voltage detection line to a thermistor line or a current detection line is inhibited, by a simple structure.

One aspect of the present disclosure relates to a battery module that includes a stacked body that is electrically connected to a power control unit and includes a plurality of battery cells; a restraint configured to restrain the stacked body, and the restraint including a band made of metal that extends from one end of the stacked body to the other end of the stacked body and that is electrically grounded; a voltage sensor that is provided on at least a portion of the plurality of battery cells, and the voltage sensor being configured to detect a voltage of the portion of the plurality of battery cells; a first wire that is connected to the voltage sensor and extends in a stacking direction of the battery cells; a temperature sensor configured to measure a temperature of the stacked body or a current sensor configured to measure a current that flows into and out of the stacked body; and a second wire that is connected to the temperature sensor or the current sensor, and extends in the stacking direction. A voltage lower than that of the first wire is applied to the second wire. The metal band is arranged between the first wire and the second wire.

In this aspect, when noise is generated in a system that is connected to the battery module, that noise is transmitted to the voltage sensor. The noise that is transmitted to the voltage sensor will then be transmitted to the first wire. When the noise reaches the first wire, an electric field from the noise will form around the first wire. However, the electric field formed by the noise is able to be inhibited from reaching the second wire because the grounded metal band is arranged between the first wire and the second wire. As a result, the noise that reached the first wire is able to be inhibited from being transmitted to the second wire.

The battery module according to this aspect of the present disclosure is therefore able to inhibit noise from the first wire from being transmitted to the second wire, by a simple structure.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
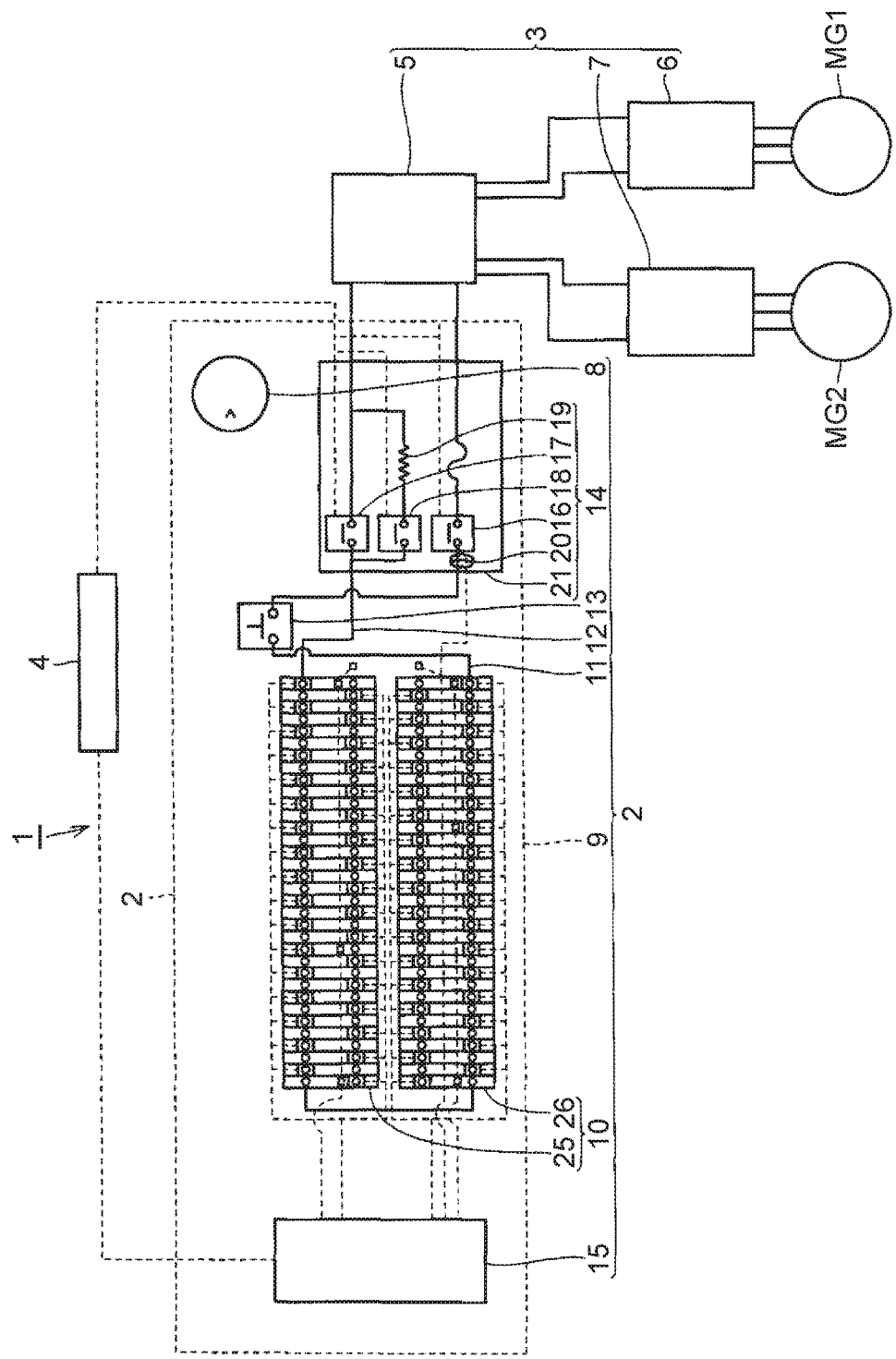
FIG. 1 is a schematic view showing a frame format of the general structure of an exemplary HV system.

FIG. 1 is a schematic view showing a frame format of the general structure of a HV system 1. As shown in FIG. 1, the HV system 1 includes a power control unit 3, a battery pack 2 that is electrically connected to the power control unit 3, and a rotary electric machine MG1 and a rotary electric machine MG2 that are connected to the power control unit 3.

The power control unit 3 includes a converter 5 that steps up direct-current power supplied from the battery pack 2, an inverter 6 that is connected to the converter 5 and the rotary electric machine MG1, and an inverter 7 that is connected to the converter 5 and the rotary electric machine MG2.

The converter 5 and the inverters 6 and 7 include a plurality of elements. The rotary electric machine MG1 and the rotary electric machine MG2 each include a stator (not shown) and a rotor (not shown), with a stator coil (not shown) attached to the stator.

Noise may be generated when the converter 5 is driven or when the inverters 6 and 7 are driven. Also, noise may be generated in the stator coil when the rotary electric machines MG1 and MG2 are driven.

The battery pack 2 includes a housing case 9, a blower 8 provided inside the housing case 9, a battery unit 10 that is housed in the housing case 9, a positive output line 11 and a negative output line 12 that are connected to the battery unit 10, a junction box 14 to which the positive output line 11 and the negative output line 12 are connected and that is housed inside the housing case 9, a service plug 13, and a battery control portion 15.

The junction box 14 includes a SMR (System Main Relay) 16 that is connected to the positive output line 11, a SMR 17 that is connected to the negative output line 12, a SMR 18 and a resistor 19 that are provided in parallel with respect to the SMR 17, a current sensor 20 that is provided in the positive output line 11, and a housing case 21.

The current sensor 20 is provided in a portion of the positive output line 11 that is between the SMR 16 and the service plug 13.

The battery unit 10 includes a battery module 25 and a battery module 26. The battery module 25 and the battery module 26 are connected together in series.

Figure 2:
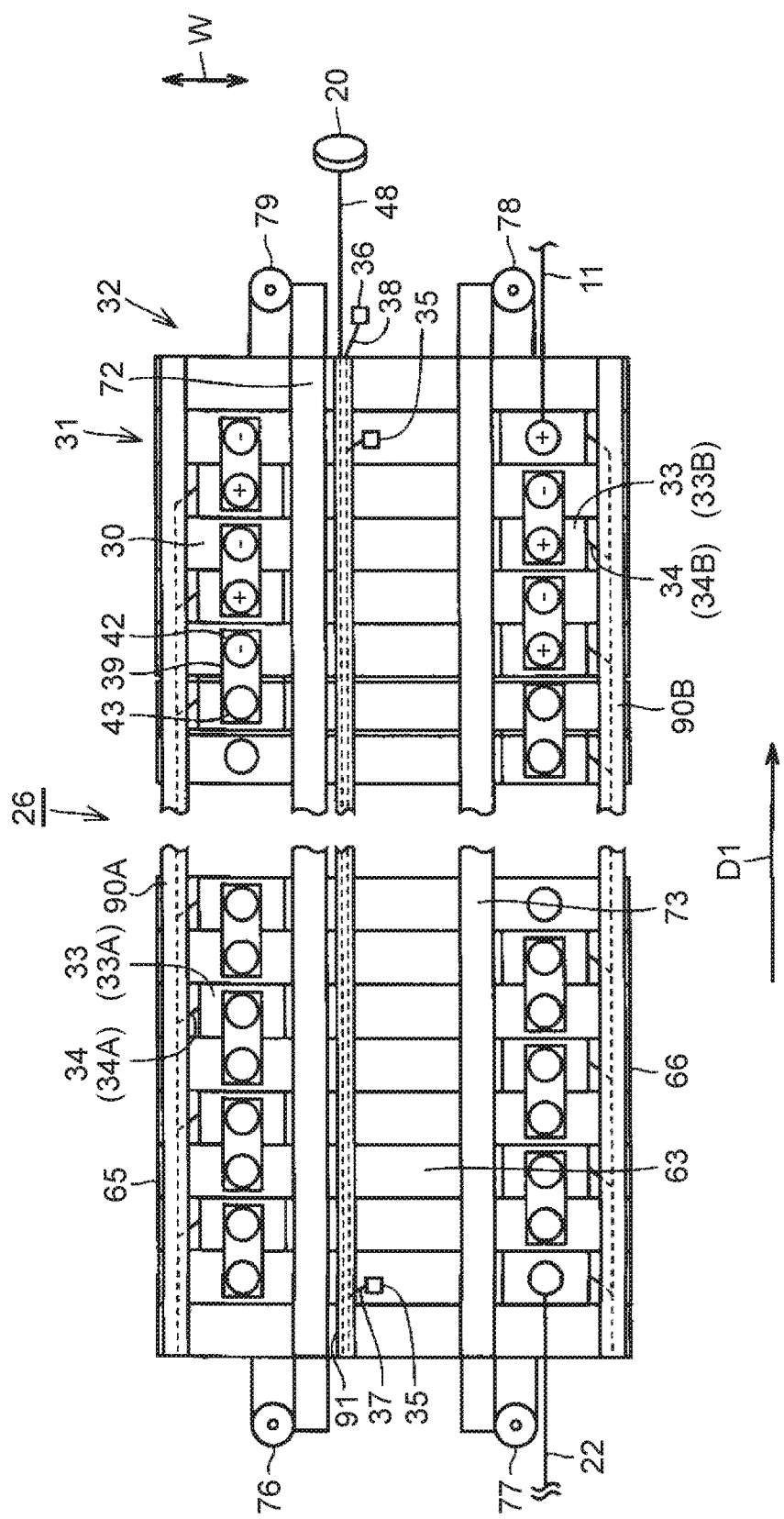
FIG. 2 is a plan view showing a frame format of an exemplary battery module.

As shown in FIG. 2, the battery module 26 includes a stacked body 31 that is electrically connected to the power control unit 3 and includes a plurality of battery cells 30, a restraint 32 that restrains this stacked body 31, a voltage sensor 33 that is provided on each battery cell 30, and a wire 34 that is connected to each voltage sensor 33. The battery module 26 further includes a plurality of temperature sensors 35, a temperature sensor 36 provided near the battery module 26, a wire 37 that is connected to each temperature sensor 35, a wire 38 that is connected to the temperature sensor 36, and a bus bar 39 that electrically connects the battery cells 30 together.

The stacked body 31 is formed by the plurality of battery cells 30 being stacked in a stacking direction D1. A separator (not shown) that is made of resin may be arranged between adjacent battery cells 30. The stacked body 31 is electrically connected to the power control unit 3 via the positive output line 11, the service plug 13, the junction box 14, a power line 22, the battery module 25, and the like.

Figure 3:
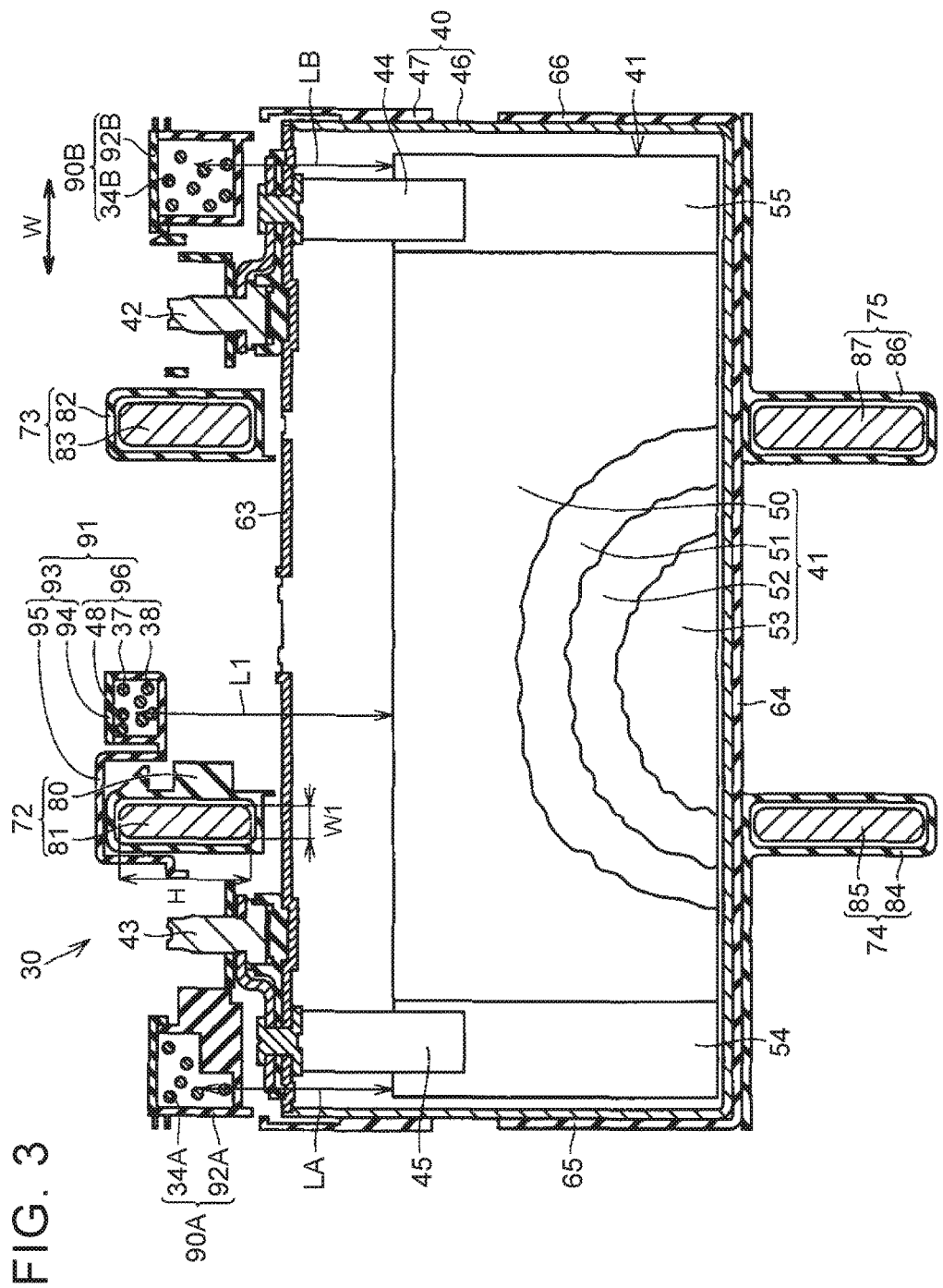
FIG. 3 is a sectional view of an exemplary battery cell.

As shown in FIG. 3, each of the battery cells 30 includes a case 40, an electrode body 41 that is housed inside of the case 40, external terminals 42 and 43 that are provided on an upper surface of the case 40, a connecting portion 44 that connects the external terminal 42 to the electrode body 41, and a connecting portion 45 that connects the external terminal 43 to the electrode body 41.

The case 40 includes a box-shaped metal case 46, and a resin frame 47 that is provided on a peripheral surface of this metal case 46.

The electrode body 41 includes a sheet-like positive electrode 50, a sheet-like separator 51, a sheet-like negative electrode 52, and a sheet-like separator 53, and is formed by rolling the positive electrode 50, the separator 51, the negative electrode 52, and the separator 53 while they are in a stacked state.

The positive electrode 50 includes a reactive portion where a positive-electrode active material or the like has been applied to a metal foil, and an exposed portion 54 where the positive-electrode active material or the like has not been applied and the metal foil is exposed. The negative electrode 52 includes a reactive portion where a negative-electrode active material or the like has been applied to a metal foil, and an exposed portion 55 where the negative-electrode active material or the like has not been applied and the metal foil is exposed. The reactive portion of the positive electrode 50 and the reactive portion of the negative electrode 52 are arranged facing one another with the separator 51 or the separator 53 in between.

The exposed portion 54 of the positive electrode 50 is positioned on one end side of the electrode body 41, and the exposed portion 55 of the negative electrode 52 is positioned on the other end side of the electrode body 41. The connecting portion 45 connects the exposed portion 54 to the external terminal 43, and the connecting portion 44 connects the exposed portion 55 to the external terminal 42. Electrolyte is filled inside the metal case 46, and the electrode body 41 is arranged immersed in the electrolyte.

As shown in FIG. 2, battery cells 30 that are adjacent in the stacking direction D1 of the battery cells 30 are connected together by the bus bar 39. Thus, adjacent battery cells 30 are connected together in series. More specifically, the external terminal 42 of a first battery cell 30 is connected by the bus bar 39 to the external terminal 43 of a second battery cell 30 that is adjacent to the first battery cell 30.

In the example shown in FIG. 2, the battery cells 30 are arranged such that the external terminal 42 and the external terminal 43 are alternating in the stacking direction D1 of the battery cells 30. As a result, the bus bar 39 that connects the battery cells 30 together in series need only connect the external terminal 42 and the external terminal 43 that are adjacent in the stacking direction D1 of the battery cells 30, so the length of the bus bar 39 is short.

Figure 4:
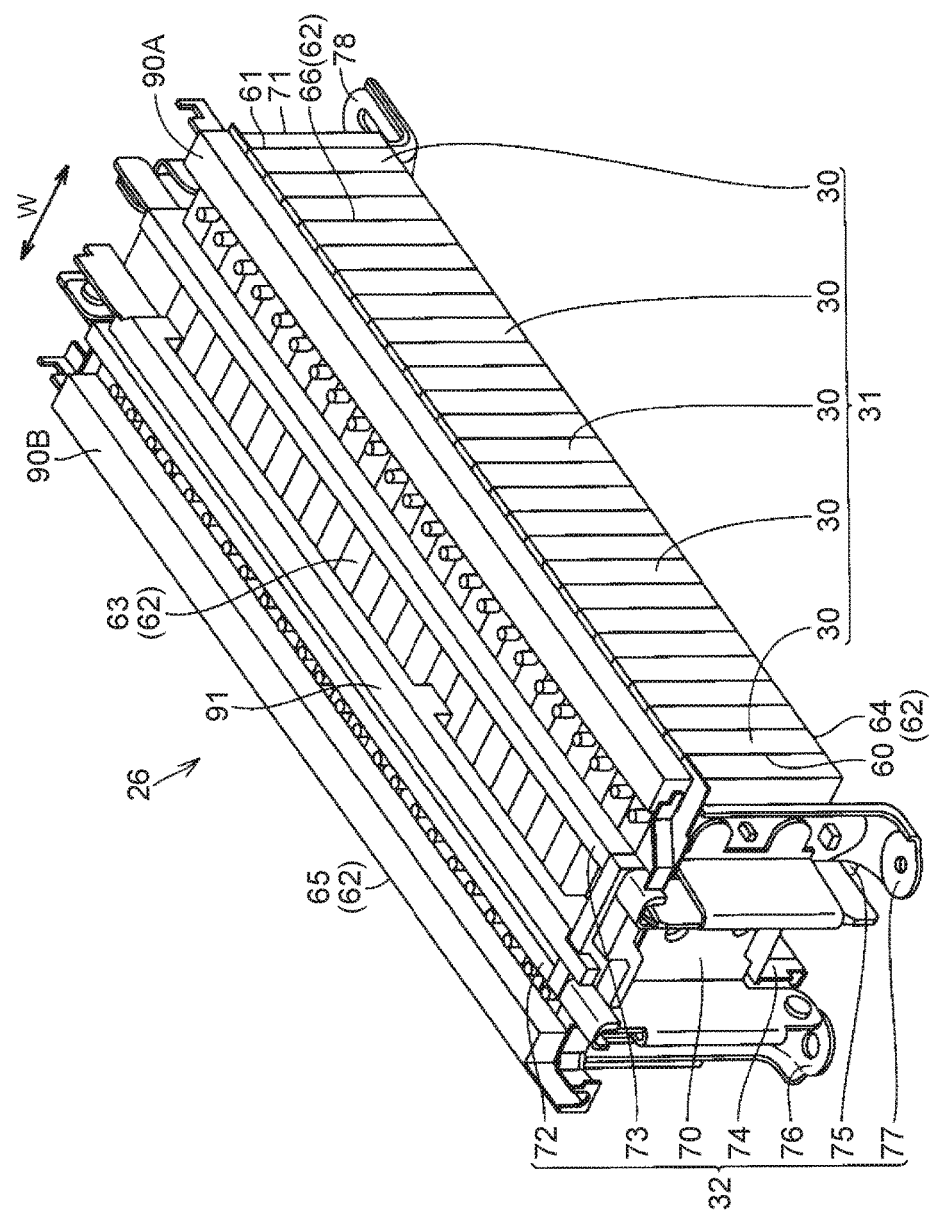
FIG. 4 is a perspective view of the battery module of FIG. 2.

As shown in FIG. 4, the stacked body 31 is formed in a generally cuboid shape. The stacked body 31 includes an end surface 60 and an end surface 61 positioned one on each end in the stacking direction D1 of the battery cells 30, and a plurality of peripheral surfaces 62 positioned between the end surface 60 and the end surface 61. The plurality of peripheral surfaces 62 are an upper surface 63, a lower surface 64, and side surfaces 65 and 66.

The restraints 32 include an end plate 70 provided on the end surface 60 of the stacked body 31, an end plate 71 provided on the end surface 61, a plurality of restraining bands 72, 73, 74, and 75 that connect the end plate 70 to the end plate 71, and a ground portion provided on both ends of the restraining bands.

The restraining bands 72, 73, 74, and 75 extend from one end of the stacked body 31 to the other end. As shown in FIG. 3, the restraining band 72 and the restraining band 73 are arranged on the upper surface 63 of the battery cells 30, and the restraining band 74 and the restraining band 75 are arranged on the lower surface 64 of the battery cells 30.

The restraining band 72 and the restraining band 73 are arranged spaced apart from each other in a width direction W on the upper surface 63, and the restraining band 74 and the restraining band 75 are arranged spaced apart from each other in the width direction W on the lower surface 64 of the battery cells 30.

As shown in FIG. 3, the restraining band 72 includes a hollow resin frame 80, and a metal band 81 that is inserted into this resin frame 80. The restraining bands 73, 74, and 75 are also formed the same, and include a hollow resin frame 82, 84, and 86, and a metal band 83, 85, and 87 that is inserted into this resin frame 82, 84, and 86, respectively. The metal bands 81, 83, 85, and 87 are arranged extending from one end of the stacked body to the other end.

As shown in FIG. 4, a ground portion 77 is connected to one end of the restraining band 73, and a ground portion 78 is connected to the other end of the restraining band 73. The ground portion 77 connects the metal band 83 of the restraining band 73 to a body of a vehicle, such that the metal band 83 of the restraining band 73 is grounded. Similarly, the ground portion 78 connects the metal band 83 of the restraining band 73 to the body of the vehicle, such that the metal band 83 of the restraining band 73 is grounded.

Also, a ground portion 76 is connected to one end of the restraining band 72, and a ground portion 79, shown in FIG. 2, is connected to the other end of the restraining band 72. The ground portions 76 and 79 both connect the metal band 81 of the restraining band 72 to the body of the vehicle, such that the metal band 81 is grounded.

As shown in FIG. 4, one end of the metal band 87 of the restraining band 75 is connected to the ground portion 77, and the other end of the metal band 87 is connected to the ground portion 78. As such, the metal band 87 of the restraining band 75 is grounded to the body of the vehicle. One end of the metal band 85 of the restraining band 74 is connected to the ground portion 76, and the other end of the metal band 85 of the restraining band 74 is connected to the ground portion 79. As such, the metal band 85 of the restraining band 74 is grounded to the body of the vehicle.

As shown in FIG. 2, the voltage sensor 33 is provided on each battery cell 30. The voltage sensor 33 is provided on the external terminal 43 of each battery cell 30. The voltage sensor 33 measures the voltage between the external terminal 43 and the external terminal 42 of the battery cell 30 on which the voltage sensor 33 is provided, and detects the cell voltage of the battery cell 30.

The battery cells 30 are arranged such that the external terminals 42 and the external terminals 43 are arranged alternately in the stacking direction D1 of the battery cells 30. Therefore, the plurality of voltage sensors 33 include voltage sensors 33A that are arranged on the side surface 65 side of the stacked body 31, and voltage sensors 33B that are arranged on the side surface 66 side of the stacked body 31. Hereinafter, sensors that are provided in plurality may sometimes be referred to in the singular to simplify the description and facilitate understanding.

A wire 34A (a first wire) is connected to each voltage sensor 33A, and a wire 34B (a first wire) is connected to each voltage sensor 33B. The wires 34A and 34B are covered by resin frames (not shown). The wires 34A and the wires 34B are mounted to the battery module 26 so as to extend in the stacking direction D1 of the battery cells 30. Hereinafter, wires that are provided in plurality may sometimes be referred to in the singular to simplify the description and facilitate understanding.

The battery module 26 includes a high-voltage wire 90A and a high-voltage wire 90B that are provided on the upper surface 63, and a low-voltage wire 91. As discussed above, the restraining band 72 and the restraining band 73 are arranged spaced apart in the width direction W of the stacked body 31, with the restraining band 72 arranged on the side surface 65 side, and the restraining band 73 arranged on the side surface 66 side.

The high-voltage wire 90A is arranged in a position nearer to the side surface 65 than the restraining band 72, and the high-voltage wire 90B is arranged in a position nearer to the side surface 66 than the restraining band 73. Also, the low-voltage wire 91 is arranged between the restraining band 72 and the restraining band 73.

The wires 34A that are connected to the voltage sensors 33A are bundled together to form the high-voltage wire 90A. The wires 34B that are connected to the voltage sensors 33B are bundled together to form the high-voltage wire 90B. The wires 37 (second wires) that are connected to the temperature sensors 35, the wire 38 (a second wire) that is connected to the temperature sensor 36, and a wire 48 that is connected to the current sensor 20 are all bundled together to form the low-voltage wire 91. The temperature sensors 35 measure the temperatures of the battery cells 30 on which they are provided, and the temperature sensor 36 measures the temperature around the stacked body 31. The wires 37 and the wire 38 are also mounted to the battery module 26 so as to extend in the stacking direction D1 of the battery cells 30.

As shown in FIG. 3, the high-voltage wire 90A includes a hollow resin frame 92A and the plurality of wires 34A that are housed in the resin frame 92A, and the high-voltage wire 90B includes a hollow resin frame 92B and the plurality of wires 34B that are housed in the resin frame 92B.

The low-voltage wire 91 includes a hollow resin frame 93, and a wire bundle 96 that is housed in this resin frame 93. The wire bundle 96 includes the wires 37 and 38, and the wire 48. The resin frame 93 includes a wire frame 94 that houses the wires 37, 38, and 48, and an engaging portion 95 that is connected to this wire frame 94. The engaging portion 95 is engaged with the resin frame 80 of the restraining band 72.

Also, the metal band 81 of the restraining band 72 is arranged between the low-voltage wire 91 and the high-voltage wire 90A, and the metal band 83 of the restraining band 73 is arranged between the low-voltage wire 91 and the high-voltage wire 90B.

Voltage of the battery cells 30 is applied to the wires 34A and the wires 34B. This voltage that is applied to the wires 34A and the wires 34B is higher than a voltage that is applied to the wires 37 that are connected to the temperature sensors 35 and the voltage that is applied to the wire 38 that is connected to the temperature sensor 36.

Similarly, the voltage that is applied to the wires 34A and the wires 34B is higher voltage than the voltage that is applied to the wire 48 that is connected to the current sensor 20.

The wires 34A and the wires 34B are connected to the external terminals 43 and the external terminals 42. The external terminals 43 and external terminals 42 are connected to the positive output line 11 and the negative output line 12 as shown in FIG. 1, via the bus bars 39 and the like. The positive output line 11 and the negative output line 12 are connected to the power control unit 3.

Noise may be generated when the converter 5 is driven or when the inverters 6 and 7 are driven. Noise may also be generated in the stator coil when the rotary electric machines MG1 and MG2 are driven. This noise travels along the positive output line 11 and the negative output line 12 and reaches the battery pack 2. The noise is then transmitted to the wires 34A and 34B via the external terminals 42 and 43.

Referring to FIG. 3, when noise is transmitted to the wire 34A, an electric field forms around the wire 34A by this noise. Because the metal band 81 is grounded, even if the electric field due to the noise reaches the metal band 81, the potential of the metal band 81 will not fluctuate, and the metal band 81 blocks the transmission of the electric field created by the noise. The wires 37, 38, and 48 are arranged on the opposite side of the metal band 81 from the wire 34A, so the electric field formed by the noise is inhibited from reaching the wires 37, 38, and 48. As a result, even if noise is transmitted to the wire 34A, the noise is able to be inhibited from being transmitted to the wires 37, 38, and 48.

Because the output values of the wires 37 and 38 are able to be inhibited from oscillating from the noise, the battery control portion 15 is able to accurately ascertain the temperature of the battery cells 30. The output value of the wire 48 is also able to be inhibited from oscillating from the noise, so the battery control portion 15 is able to accurately ascertain the value of current that flows into and out of the battery unit 10.

Similarly, the grounded metal band 83 is arranged between the low-voltage wire 91 and the high-voltage wire 90B, so even if noise flows to the wire 34B of the support frame 90, the electric field formed by this noise is inhibited from being transmitted to the wires 37, 38, and 48 of the low-voltage wire 91.

In this way, the wires 37, 38, and 48 are arranged between the metal band 81 and the metal band 83 that are arranged spaced apart from each other in the width direction W, and the high-voltage wires 90A and 90B are arranged on the outer peripheral edge portion side of the upper surface 63 (the peripheral surfaces 62), so noise from the high-voltage wires 90A and 90B is able to be inhibited from being superimposed on the wires 37, 38, and 48.

Here, in the example shown in FIG. 3 and the like, noise is inhibited from being transmitted to the wires 37 and 38 and the wire 48, but a structure in which noise is inhibited from being transmitted to all of these wires (i.e., the wires 37 and 38 and the wire 48) is not absolutely essential to the exemplary embodiment.

That is, at least one of the wires 37 and 38, and the wire 48, inside the resin frame 93 may be housed in the low-voltage wire 91. If the wires 37 and 38 are housed inside the resin frame 93, the battery unit 10 is able to obtain an accurate temperature. Also, if the wire 48 is housed inside the resin frame 93, the battery unit 10 is able to obtain an accurate current value.

In the example shown in FIGS. 2-4, the voltage sensor 33 is provided on each battery cell 30, but the voltage sensor 33 may also be arranged on a specific battery cell 30.

As shown in FIG. 3, the metal band 81 of the restraining band 72 is arranged between the external terminal 43 and the wires 37, 38, and 48, and the metal band 83 of the restraining band 73 is arranged between the external terminal 42 and the low-voltage wire 91. The external terminal 43 and the external terminal 42 are connected to the power control unit 3 via the bus bar 39, and the positive output line 11 and the negative output line 12 and the like. Therefore, noise generated by the power control unit 3 is transmitted to the external terminals 42 and 43. However, the grounded metal bands 81 and 83 are arranged between the external terminals 42 and 43 and the wires 37, 38, and 48, such that noise transmitted to the external terminals 42 and 43 is inhibited from being transmitted to the wires 37, 38, and 48 of the low-voltage wire 91.

As shown in FIG. 3, the distance between the wires 37, 38, and 48 of the low-voltage wire 91 and the electrode body 41 is denoted as distance L1. The distance between the wire 34A of the high-voltage wire 90A and the electrode body 41 is denoted as distance LA, and the distance between the wire 34B of the high-voltage wire 90B and the electrode body 41 is denoted as distance LB. The distance L1 is the average value of the distance between the wires 37, 38, and 48 and the electrode body 41, and the distance LA is the average value of the distance between each wire 34A and the electrode body 41. Also, the distance LB is the average value of the distance between each wire 34B and the electrode body 41. The distance L1 is longer than the distances LA and LB.

Noise from the power control unit 3 is also transmitted to the electrode body 41. Because the distance L1 is longer than the distances LA and LB, the noise transmitted to the electrode body 41 is able to be inhibited from being transmitted to the wires 37, 38, and 48.

As shown in FIG. 3, when the metal band 81 is viewed in a sectional view in a direction perpendicular to the direction in which the metal band 81 extends, it is evident that a height H of the metal band 81 is greater than a width W1 of the metal band 81. By increasing the height H of the metal band 81 in this way, noise from the high-voltage wire 90A is able to be better inhibited from being transmitted to the low-voltage wire 91. Also, by increasing the height H, a long distance between the low-voltage wire 91 and the electrode body 41 can be ensured, while inhibiting the transmission of noise from the high-voltage wire 90A.

The battery module 26 has been described with reference to FIGS. 2-4. The battery module 25 has a structure similar to that of the battery module 26.

Figure 5:
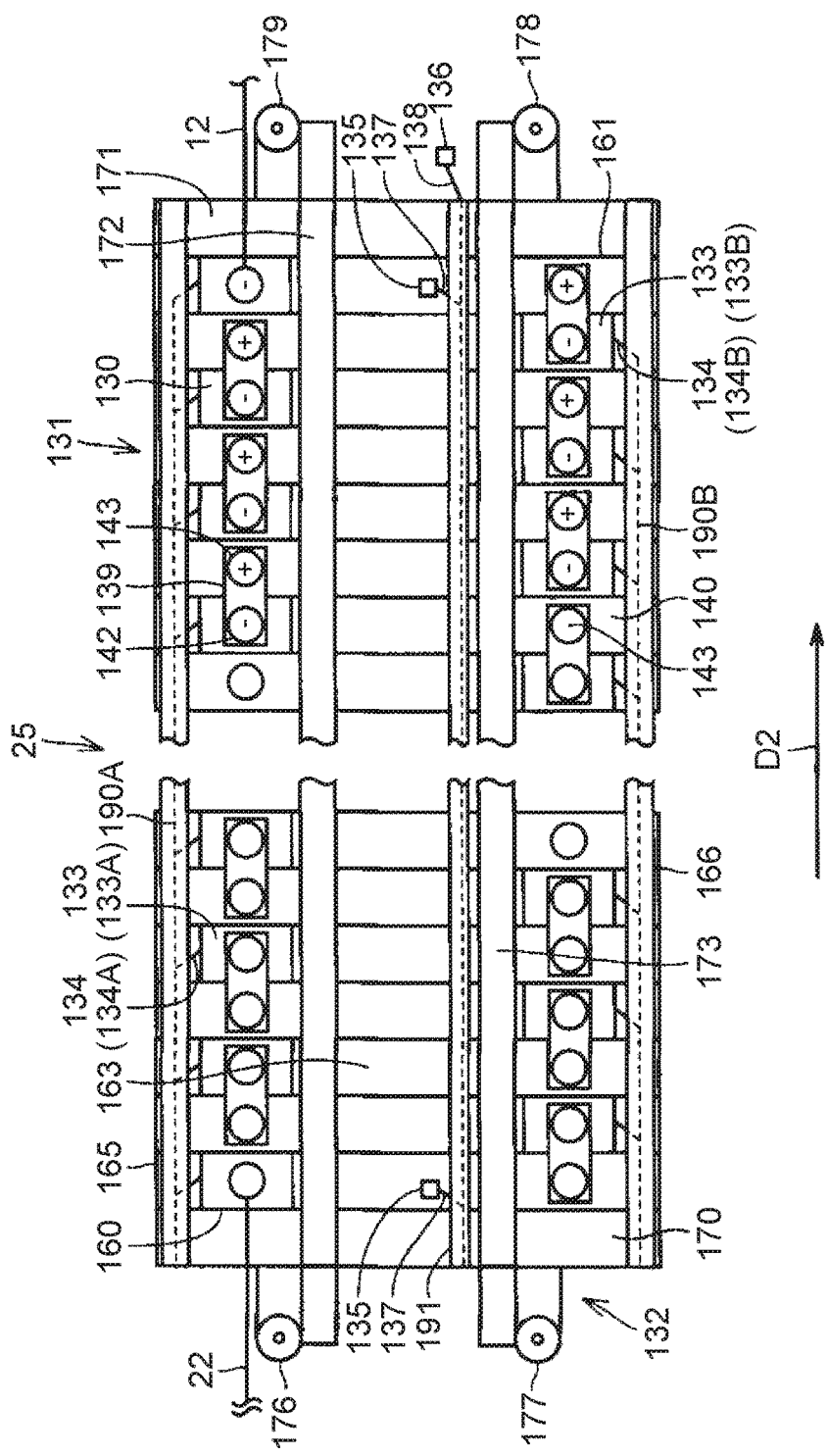
FIG. 5 is a plan view showing a frame format of another exemplary battery module.

FIG. 5 is a plan view showing a frame format of the battery module 25. As shown in FIG. 5, the battery module 25 includes a stacked body 131 formed by an array of a plurality of battery cells 130 in a stacking direction D2, a restraint 132 that restrains the stacked body 131, a voltage sensor 133 provided on the stacked body 131, a plurality of temperature sensors 135 provided on the stacked body 131, and a temperature sensor 136 arranged around the stacked body 131. The battery module 25 also includes high-voltage wires 190A and 190B, and a low-voltage wire 191.

The stacked body 131 is electrically connected to the power control unit 3 via the power line 22 and the negative output line 12 and the like. The stacked body 131 is formed in a generally cuboid shape. The stacked body 131 includes an end surface 160, an end surface 161, and an upper surface 163 and side surfaces 165 and 166 positioned between the end surface 160 and the end surface 161.

Each battery cell 130 includes a case 140, and an external terminal 142 and an external terminal 143 that are provided on an upper surface of the case 140. The external terminal 142 and the external terminal 143 of adjacent battery cells 130 are connected together by a bus bar 139, such that the battery cells 130 are connected together in series.

The battery cells 130 are arranged such that the external terminal 142 and the external terminal 143 are arranged alternately in the stacking direction D2 of the battery cells 130. Therefore, the length of the bus bar 139 is able to be kept short.

The restraint 132 includes an end plate 170 provided on the end surface 160, an end plate 171 provided on the end surface 161, a restraining band 172 and a restraining band 173, ground portions 176, 177, 178, and 179, and two restraining bands (not shown) provided on a lower surface of the stacked body 131. Each of the restraining bands 172 and 173 includes a hollow resin frame, and a metal band (not shown) inserted into this resin frame. The metal band of each restraining band 172 and 173 is fastened to the end plate 170 and the end plate 171. One end of the metal band of the restraining band 172 is connected to the ground portion 176, and the other end of the restraining band 172 is connected to the ground portion 179. Then, the metal band of the restraining band 172 is grounded to the body of the vehicle by the ground portion 176 and the ground portion 179. Similarly, the metal band of the restraining band 173 is connected to the ground portion 177 and the ground portion 178, and the metal band of the restraining band 173 is grounded to the body of the vehicle by the ground portion 177 and the ground portion 178. The restraining band 172 and the restraining band 173 are arranged on the upper surface 163, spaced apart in the width direction W of the stacked body 131, with the restraining band 172 arranged on the side surface 165 side, and the restraining band 173 arranged on the side surface 166 side.

The high-voltage wire 190A and the high-voltage wire 190B are both arranged on the upper surface 163 of the stacked body 131. The high-voltage wire 190A is arranged closer to the side surface 165 side of the stacked body 131 than the restraining band 172, and the high-voltage wire 190B is arranged closer to the side surface 166 side than the restraining band 173.

The voltage sensor 133 is provided on each battery cell 130. Each voltage sensor 133 is connected to the positive-electrode external terminal 143 and the negative-electrode external terminal 142 of each battery cell 130. These voltage sensors 133 measure the voltages of the battery cells 130.

The voltage sensor 133 is provided on the external terminal 142 of each battery cell 130. The plurality of battery cells 130 are arranged such that the external terminal 142 and the external terminal 143 are alternating in the stacking direction D2 of the battery cells 130. Therefore, the voltage sensor 133 includes a voltage sensor 133A arranged on the side surface 165 side, and a voltage sensor 133B arranged on the side surface 166 side. A wire 134A (a first wire) is connected to the voltage sensor 133A, and a wire 134B (a first wire) is connected to the wire 134B. Also, the wires 134A are housed bundled with the high-voltage wire 190A, and the wires 134B are housed bundled with the high-voltage wire 190B. The wires 134A and the wires 134B are mounted to the battery module 25 so as to extend in the stacking direction D2.

The low-voltage wire 191 is arranged on the upper surface 163 of the stacked body 131, and is arranged between the restraining band 172 and the restraining band 173. A wire 137 is connected to each temperature sensor 135, and the plurality of wires 137 (second wires) are housed inside the low-voltage wire 191. Also, a wire 138 (a second wire) is connected to the temperature sensor 136 arranged near the stacked body 131, and this wire 138 is also housed inside the low-voltage wire 191. The wire 138 and the wires 137 are also mounted to the battery module 25 so as to extend in the stacking direction D2.

Here, the voltage applied to the wires 137 and the wire 138 is lower than the voltage applied to the wires 134A and 134B. The wires 134A and 134B are connected to the negative output line 12 via the bus bar 139 and the like. As such, noise generated by the power control unit 3 and the like is transmitted to the wires 134A and 134B through the negative output line 12 and the bus bar 139.

However, in the battery module 25, the metal band of the grounded restraining band 173 is arranged between the low-voltage wire 191 inside of which the wires 137 and 138 are housed, and the high-voltage wire 190B. Therefore, noise transmitted to the high-voltage wire 190B is able to be inhibited from being transmitted to the wires 137 and 138 of the low-voltage wire 191.

Similarly, the grounded restraining band 172 is arranged between the low-voltage wire 191 and the high-voltage wire 190A, such that noise transmitted to the high-voltage wire 190A is able to be inhibited from being transmitted to the wires 137 and 138 of the low-voltage wire 191.

Figure 6:
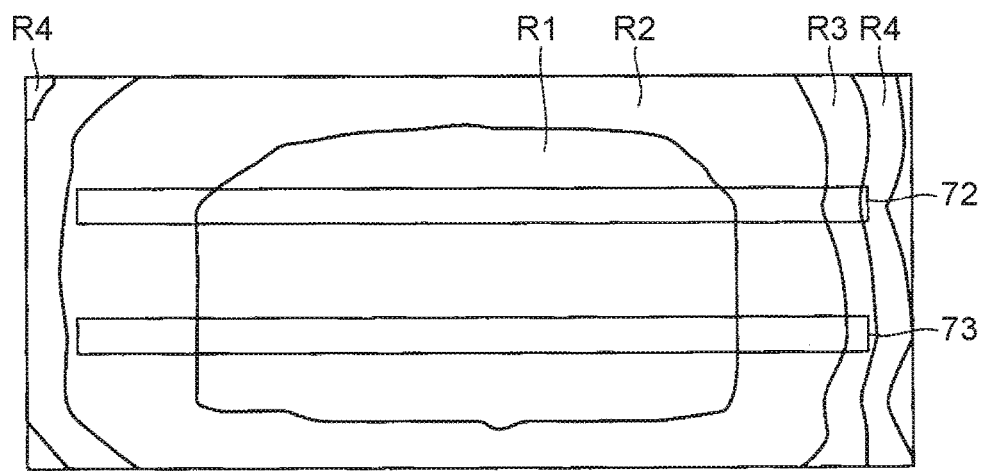
FIG. 6 is a graph showing the electric field distribution when restraining bands are not grounded.
Figure 7:
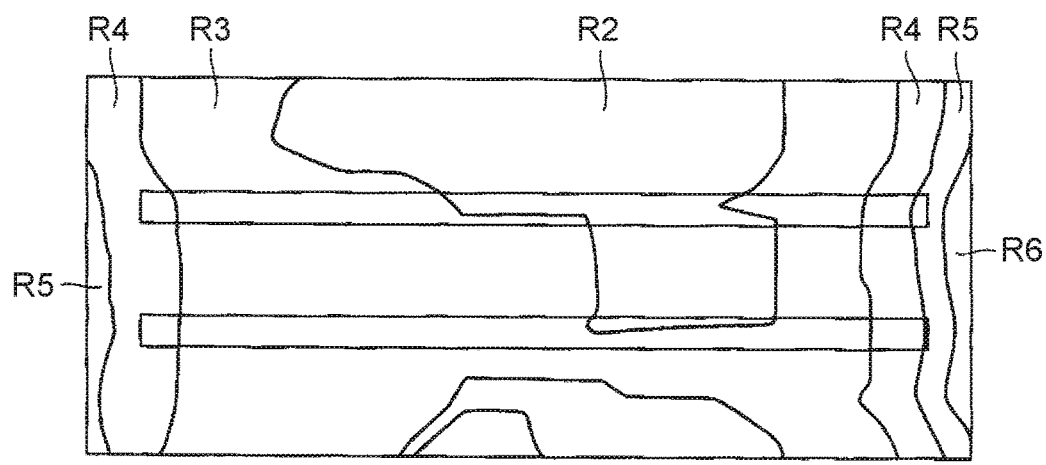
FIG. 7 is a graph showing the electric field distribution when restraining bands are grounded.

FIGS. 6 and 7 are graphs showing an electric field distribution of the battery module 26 in a position that is the distance L1 away from the electrode body 41, when the power control unit 3 is being driven. More specifically, FIGS. 6 and 7 are views showing the electric field distribution when an accelerator pedal and a brake pedal are both both depressed, in a Ready_ON state. At the same time, at least the converter 5 and the inverter 7 are being driven, and current is also flowing through the stator coil of the rotary electric machine MG2.

FIG. 6 is a graph showing the electric field distribution when none of the restraining bands 72, 73, 74, and 75 are grounded. FIG. 7 is a graph showing the electric field distribution when all of the restraining bands 72, 73, 74, and 75 are grounded.

In FIGS. 6 and 7, the electric field intensity in regions R1 to R6 increases from region R6 to region R1 in the following order: region R6, region R5, region R4, region R3, region R2, region R1. That is, the region R1 is the region where the electric field intensity is highest. As is evident from FIGS. 6 and 7, the electric field intensity is lowest all around when all of the restraining bands 72, 73, 74, and 75 are grounded. In particular, it is evident that the electric field intensity of a portion positioned between the restraining band 72 and the restraining band 73 is able to be reduced by grounding the restraining bands 72, 73, 74, and 75. Therefore, it is evident that noise can be inhibited from being transmitted to the wires 37, 38, and 48 that are housed inside the low-voltage wire 91, by arranging the low-voltage wire 91 between the restraining band 72 and the restraining band 73 when grounded.

Here, the battery module according to the exemplary embodiment will be compared to a battery module according to a comparative embodiment, with reference to FIGS. 8-11.

Figure 8:
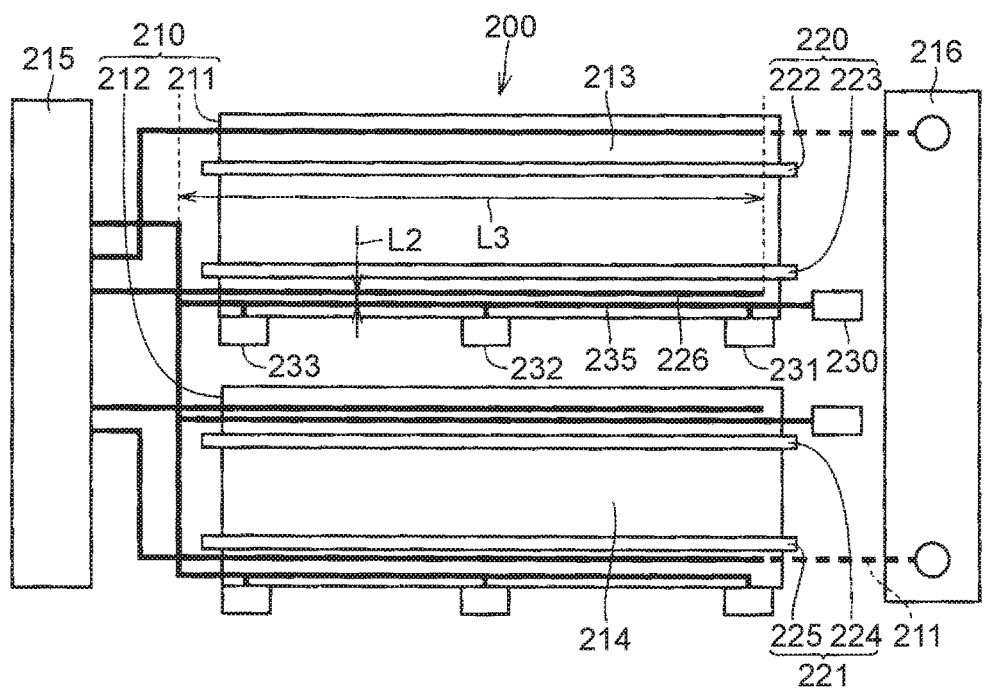
FIG. 8 is a plan view showing a frame format of an exemplary battery pack according to a comparative embodiment.

FIG. 8 is a plan view showing a frame format of a battery pack according to the comparative embodiment. The battery pack 200 includes a battery unit 210, a junction box 214, and a battery control portion 215.

The battery unit 210 includes a battery module 211 and a battery module 212. The battery module 211 and the battery module 212 are connected together in series.

The battery modules 211 and 212 include stacked bodies 213 and 214, and restraints 220 and 221 that restrain the stacked bodies 213 and 214, respectively. The restraint 220 includes restraining bands 222 and 223 that are provided on an upper surface of the stacked body 213, and the restraint 221 includes restraining bands 224 and 225 that are provided on an upper surface of the stacked body 214.

The battery module 211 includes a voltage sensor provided on each battery cell, a high-voltage line 226 formed by the wires from the voltage sensors being bundled together, a plurality of temperature sensors 230, 231, 232, and 233, and a low-voltage line 235 formed by wires that are connected to the temperature sensors 230, 231, 232, and 233 being bundled together.

Here, the restraining bands 222 and 223, the high-voltage line 226, and the low-voltage line 235 are all provided on an upper surface of the stacked body 213. The restraining band 223 is arranged in a position closer to one side surface of the stacked body 213 than the restraining band 222, and the high-voltage line 226 and the low-voltage line 235 are arranged in positions closer to the one side surface than the restraining band 222.

Therefore, the restraining band 223 is not arranged between the high-voltage line 226 and the low-voltage line 235, and the high-voltage line 226 and the low-voltage line 235 are arranged running side-by-side.

Figure 9:
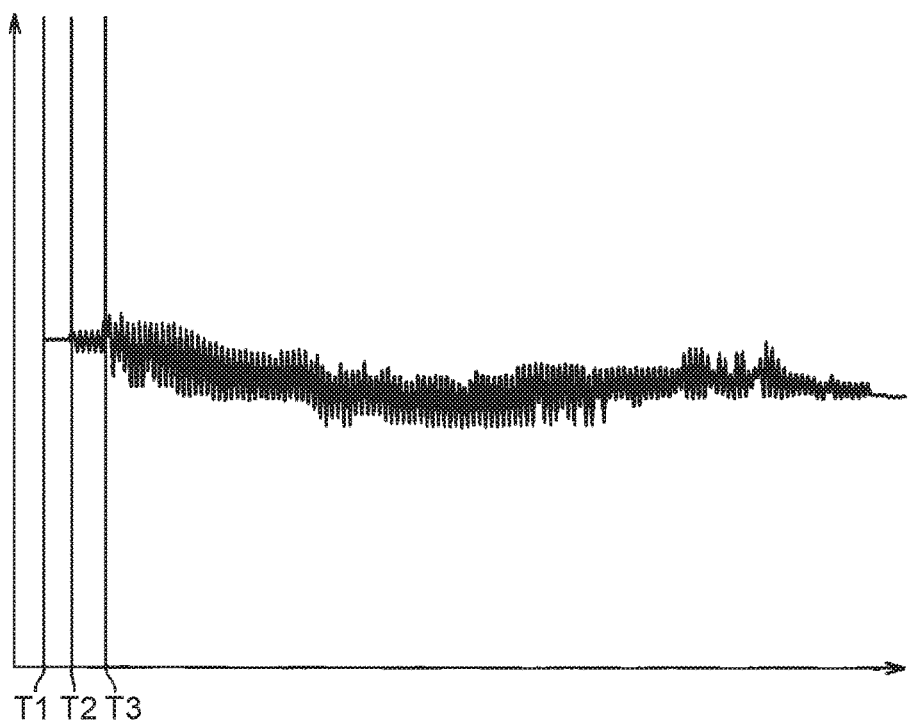
FIG. 9 is a graph showing an output value of an exemplary temperature sensor.

FIG. 9 is a graph illustrating an output value from the temperature sensor 230. In FIG. 9, the horizontal axis represents time, and the vertical axis represents the output value from the temperature sensor 230, and T1 denotes the timing of IG_ON, T2 denotes the timing of Ready_ON. T3 denotes the timing at which both the accelerator pedal and the brake pedal start to be depressed.

As is evident from FIG. 9, after T3, the output value from the temperature sensor 230 starts to oscillate greatly.

Figure 10:
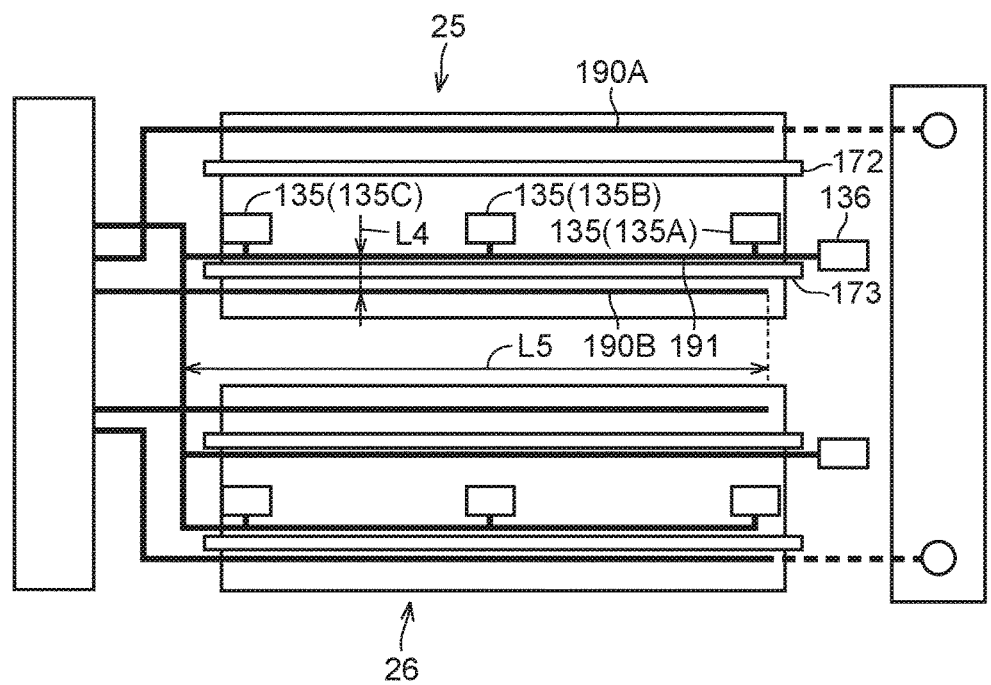
FIG. 10 is a plan view showing the frame format of the battery pack of FIG. 5 according to the exemplary embodiment.

FIG. 10 is a plan view showing a frame format of the battery pack 2 according to the exemplary embodiment. The temperature sensors 135A, 135B, and 135C shown in FIG. 10 correspond to the temperature sensors 231, 232, and 233 shown in FIG. 8, and the temperature sensor 136 shown in FIG. 10 corresponds to the temperature sensor 230 shown in FIG. 8.

Figure 11:
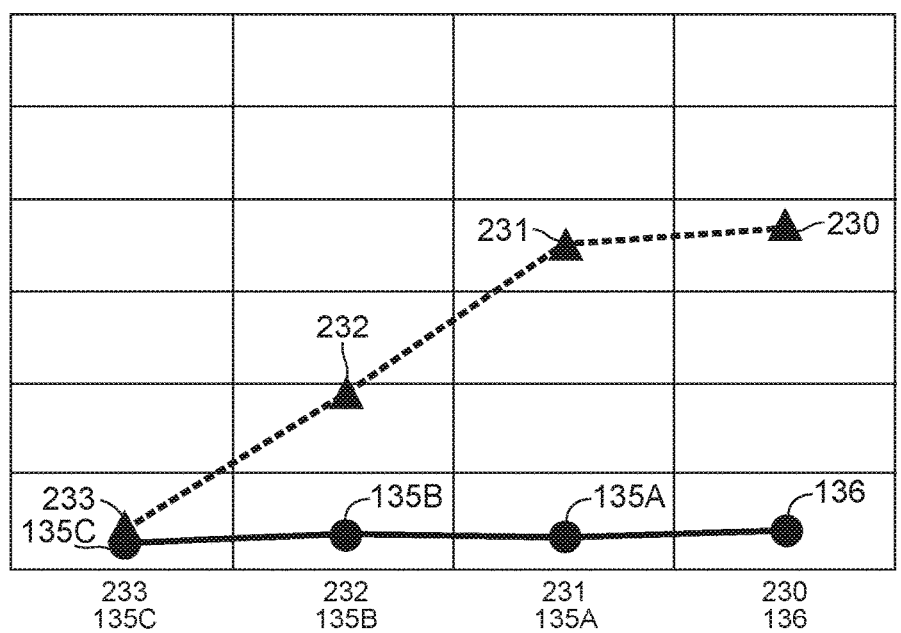
FIG. 11 is a graph showing a comparison of the amount of oscillation in the output value of each temperature sensor provided in the battery module according to the comparative embodiment, and the amount of oscillation in the output value of each temperature sensor provided in the battery module according to the exemplary embodiment.

FIG. 11 is a graph showing a comparison between the amount of oscillation of the output value of the temperature sensors provided in the battery module according to the comparative embodiment, and the amount of oscillation of the output value of the temperature sensors provided on the battery module according to the exemplary embodiment.

In FIG. 11, the broken line indicates the amount of oscillation of the output value of the temperature sensors in the comparative embodiment. As shown by this broken line, the amount of oscillation of the output value of the temperature sensor 230 is greater than that of the other temperature sensors 231, 232, and 233. More specifically, the amount of oscillation of the output value increases as the distance between the battery control portion 215 and the temperature sensors becomes longer.

The reason why the amount of oscillation of the output value increases as the distance between the battery control portion 215 and the temperature sensors becomes longer is because when the distance between the battery control portion 215 and the temperature sensors becomes longer, so too does the distance over which the high-voltage line 226 runs side-by-side with the low-voltage line 235, and as a result, the amount of noise transmitted from the high-voltage line 226 increases.

The solid line indicates the amount of oscillation of the output value of the temperature sensors provided on the battery module according to the exemplary embodiment.

As shown by the solid line, the amount of oscillation of the output values from the temperature sensors 136, 135A, 135B, and 135C is smaller than the amount of oscillation of the output values from the temperature sensors 230, 231, 232, and 233 of the comparative embodiment.

Furthermore, there is almost no oscillation of the output from the temperature sensors 136, 135A, 135B, and 135C. Therefore, it is evident that with the battery module according to the exemplary embodiment, the temperatures of the battery cells are able to be accurately detected.

Figure 12:
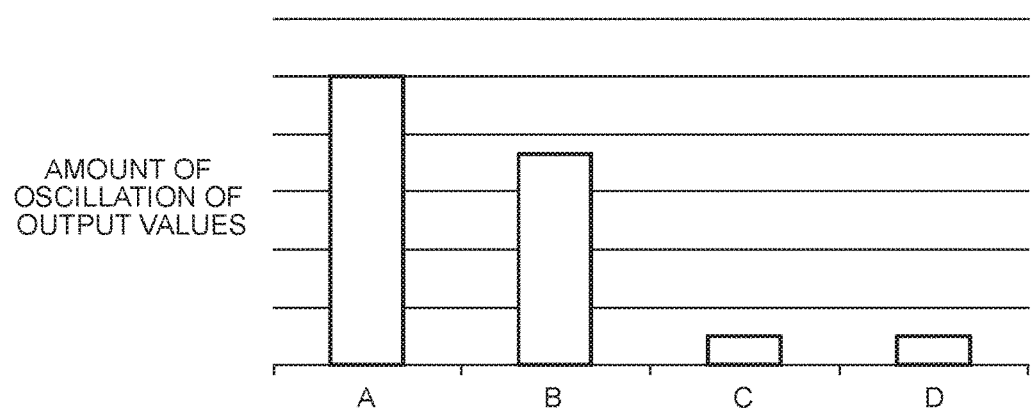
FIG. 12 is a graph showing a comparison of the range of oscillation of the output values of the temperature sensors provided in the battery module according to the exemplary embodiment, and the range of oscillation of the output values when the distance between a high-voltage line and a low-voltage line is changed in the battery module according to the comparative embodiment.

FIG. 12 is a graph showing a comparison between the range of oscillation of the output values of the temperature sensors provided in the battery module according to the exemplary embodiment, and the range of oscillation of the output values when the distance between the high-voltage line and the low-voltage line is changed in the battery module according to the comparative embodiment.

"A" in FIG. 12 represents the average value of the range of oscillation of the output values of the temperature sensors provided in the battery module 211 according to the comparative embodiment shown in FIG. 8. In FIG. 12, the high-voltage line 226 and the low-voltage line 235 are close to one another.

In the battery module represented by "B", the high-voltage line 226 and the low-voltage line 235 are arranged such that the distance between them is greater than it is in the battery module represented by "A". For example, when the distance between the high-voltage line 226 and the low-voltage line 235 is a distance L2, and the distance over which the high-voltage line 226 and the low-voltage line 235 run side-by-side is a distance L3, then the ratio of the distance L2 to the distance L3 (i.e., L2:L3) is 1:16. In the battery module represented by "C", the high-voltage line 226 and the low-voltage line 235 are arranged such that the distance L2 is greater than it is in the battery module represented by "B". More specifically, the high-voltage line 226 and the low-voltage line 235 are arranged such that the ratio of the distance L2 to the distance L3 (i.e., L2:L3) is 1:4. In the case of the battery module represented by "C", the low-voltage line 235 is unable to be arranged on an upper surface of the stacked body 213.

"D" represents the battery module according to the exemplary embodiment. As shown in FIG. 10, if the distance between the high-voltage wire 190B and the low-voltage wire 191 is a distance L4, and the distance over which the high-voltage wire 190B and the low-voltage wire 191 run side-by-side is a distance L5, then the ratio of the distance L4 to the distance L5 (i.e., L4:L5) is 1:16.

As is evident by the graph of FIG. 12, the range of oscillation of the output value with the battery module according to the example embodiment (i.e., "D") is able to be reduced to approximately the same level as that with the battery module of "C".

Moreover, with the battery module according to the exemplary embodiment, the distance between the high-voltage wire 190B and the low-voltage wire 191 is close, and both the high-voltage wire 190B and the low-voltage wire 191 are able to be arranged on the upper surface of the battery module. As a result, the battery module is able to be compact.

While the ability to inhibit oscillation of the output values from the temperature sensors of the battery module according to the exemplary embodiment is described with reference to FIGS. 11 and 12 and the like, oscillation of the output values from the current sensor is also able to be similarly inhibited from oscillating.

While exemplary embodiments of the present disclosure are described above, these exemplary embodiments and modified examples are in all respects merely examples and should in no way be construed as limiting. The scope of the present disclosure is indicated by the scope of the claims for patent, and is intended to include all modifications that are within the scope and meanings equivalent to the scope of the claims for patent.

What is claimed is:

1. A battery module comprising:
    a stacked body that is electrically connected to a power control unit and includes a plurality of battery cells;
    a restraint configured to restrain the stacked body, the restraint including a band made of metal that extends from one end of the stacked body to the other end of the stacked body and that is electrically grounded;
    a voltage sensor that is provided on at least a portion of the plurality of battery cells, the voltage sensor being configured to detect a voltage of the portion of the plurality of battery cells;
    a first wire that is connected to the voltage sensor and extends in a stacking direction of the battery cells;
    a temperature sensor configured to measure a temperature of the stacked body or a current sensor configured to measure a current that flows into and out of the stacked body; and
    a second wire that is connected to the temperature sensor or the current sensor, and extends in the stacking direction, wherein
    a voltage lower than that of the first wire is applied to the second wire, and the metal band is arranged between the first wire and the second wire.

2. The battery module according to claim 1, wherein
    the battery cell includes a case, and an electrode body that is housed inside of the case; and
    a distance between the second wire and the electrode body is greater than a distance between the first wire and the electrode body.

3. The battery module according to claim 1, wherein
    the battery cell includes a case;
    the case includes two end surfaces, and a plurality of peripheral surfaces positioned between the two end surfaces;
    the restraint includes a first metal band and a second metal band that arranged spaced apart from each other and extend from the one end to the other end, the first metal band and the second metal band being provided on the same side surface;
    the second wire is arranged between the first metal band and the second metal band; and
    the first wire is arranged closer to an outer peripheral edge portion side of the peripheral side than the first metal band and the second metal band.

4. The battery module according to claim 1, wherein when the metal band is viewed in a sectional view taken along a cross-section that is perpendicular to the direction in which the metal band extends, a height of the metal band is greater than a width of the metal band.

5. A battery module comprising:
    a stacked body that is electrically connected to a power control unit and includes a plurality of battery cells;
    a restraining means for restraining the stacked body, wherein the restraining means includes a band made of metal that is electrically grounded;
    a first wire that extends in a stacking direction of the battery cells; and
    a second wire that extends in the stacking direction of the battery cells, wherein
    a voltage lower than that of the first wire is applied to the second wire, and
    the restraining means is arranged between the first wire and the second wire.

6. The battery module according to claim 5, wherein
    the band made of metal extends from one end of the stacked body to the other end of the stacked body.

7. The battery module according to claim 5, further comprising
    a voltage sensor configured to detect a voltage of a portion of the plurality of battery cells, wherein the first wire is connected to the voltage sensor.

8. The battery module according to claim 5, further comprising
    a temperature sensor configured to measure a temperature of the stacked body or a current sensor configured to measure a current that flows into and out of the stacked body, wherein the second wire is connected to the temperature sensor or the current sensor.

9. A method of inhibiting the transmission of noise from a first wire of a battery module to a second wire of the battery module, the battery module comprising a stacked body that is electrically connected to a power control unit and includes a plurality of battery cells, a restraint configured to restrain the stacked body, a first wire that extends in a stacking direction of the battery cells, and a second wire that extends in the stacking direction, the method comprising the steps of:
    arranging the restraint between the first wire and the second wire;
    electrically grounding the restraint; and
    applying a lower voltage to the second wire than that applied to the first wire.

* * * * *